US007764395B2

(12) United States Patent
Sieber et al.

(10) Patent No.: US 7,764,395 B2
(45) Date of Patent: *Jul. 27, 2010

(54) METHOD AND APPARATUS FOR BLEED-PRINTING AND METHOD AND APPARATUS FOR DECORATING A PAPER OBJECT

(76) Inventors: Jonathan D. Sieber, 20 Clubhouse La., Wayland, MA (US) 01778; Joseph S. Sieber, 44 Dean Rd., Weston, MA (US) 01293

( * ) Notice: Subject to any disclaimer, the term of this patent is extended or adjusted under 35 U.S.C. 154(b) by 898 days.

This patent is subject to a terminal disclaimer.

(21) Appl. No.: 11/230,317

(22) Filed: Sep. 19, 2005

(65) Prior Publication Data

US 2006/0193007 A1 Aug. 31, 2006

Related U.S. Application Data

(60) Continuation of application No. 10/080,613, filed on Feb. 22, 2002, now Pat. No. 6,989,912, which is a continuation of application No. 09/481,579, filed on Jan. 12, 2000, now Pat. No. 6,549,298, which is a division of application No. 09/004,533, filed on Jan. 8, 1998, now Pat. No. 6,106,651, which is a continuation of application No. 08/444,958, filed on May 19, 1995, now Pat. No. 5,730,826.

(51) Int. Cl.

| | |
|---|---|
| ***G06F 15/00*** | (2006.01) |
| ***G06K 1/00*** | (2006.01) |
| ***G06K 15/00*** | (2006.01) |
| *G06F 3/12* | (2006.01) |

(52) U.S. Cl. .................................... 358/1.18; 358/1.13

(58) Field of Classification Search ......... 358/1.1–1.18, 358/1.9–3.32

See application file for complete search history.

(56) References Cited

U.S. PATENT DOCUMENTS

| | | | |
|---|---|---|---|
| 1,690,179 | A | 11/1928 | Sadtler |
| 2,391,539 | A | 12/1945 | Avery |
| 3,166,186 | A | 1/1965 | Karn |
| 3,524,782 | A | 8/1970 | Buske |
| 3,607,526 | A | 9/1971 | Biegen |
| 3,792,819 | A | 5/1973 | Horie |
| 4,033,611 | A | 7/1977 | Johnsen |
| 4,190,478 | A | 2/1980 | Meisenberg |

(Continued)

FOREIGN PATENT DOCUMENTS

| | | |
|---|---|---|
| DE | 8807521 | 12/1988 |

(Continued)

*Primary Examiner*—Douglas Q Tran

(74) *Attorney, Agent, or Firm*—Wolf, Greenfield & Sacks, P.C.

(57) ABSTRACT

A method of bleed printing, for example, social stationery, including the steps of attaching a sheet of paper to be printed to a carrier, printing on the sheet of paper so that the printed matter extends beyond at least one edge of a die cut portion of the sheet of paper, and removing the sheet of paper from the carrier. The adhesive chosen is such that the sheet of paper is substantially free of adhesive after it is removed from the carrier. A method of decorating a napkin, including the steps of printing printed material on a label comprising directory paper, and attaching the label to a napkin using an adhesive.

33 Claims, 3 Drawing Sheets

U.S. PATENT DOCUMENTS

| | | | | |
|---|---|---|---|---|
| 4,219,596 | A | 8/1980 | Takemoto et al. | |
| 4,253,899 | A | 3/1981 | Takemoto et al. | |
| 4,479,838 | A | 10/1984 | Dunsirn et al. | |
| 4,637,712 | A | 1/1987 | Arnold et al. | |
| 4,765,654 | A | 8/1988 | Nakamura | |
| 4,873,643 | A | 10/1989 | Powell et al. | |
| 4,876,131 | A | 10/1989 | Ashby et al. | |
| 5,036,472 | A | 7/1991 | Buckley et al. | |
| 5,133,819 | A | 7/1992 | Croner | |
| 5,324,380 | A | 6/1994 | Marin | |
| 5,331,387 | A * | 7/1994 | Okada et al. | 399/385 |
| 5,370,762 | A | 12/1994 | Zukowski et al. | |
| 5,428,423 | A | 6/1995 | Clark | |
| 5,513,117 | A | 4/1996 | Small | |
| 5,530,793 | A | 6/1996 | Watkins et al. | |
| 5,546,316 | A | 8/1996 | Buckley et al. | |
| 5,557,311 | A * | 9/1996 | Perrington et al. | 347/111 |
| 5,730,826 | A | 3/1998 | Sieber et al. | |
| 5,825,996 | A | 10/1998 | Davis et al. | |
| 5,873,603 | A * | 2/1999 | Carless et al. | 283/61 |
| 5,892,892 | A | 4/1999 | Popat et al. | |
| 5,966,145 | A | 10/1999 | Miura et al. | |
| 5,997,129 | A | 12/1999 | Matsuhashi | |
| 6,106,651 | A | 8/2000 | Sieber et al. | |
| 6,137,515 | A | 10/2000 | Dickinson | |
| 6,613,412 | B1 | 9/2003 | Dressler | |

FOREIGN PATENT DOCUMENTS

| | | |
|---|---|---|
| DE | 4240825 | 6/1994 |
| DE | 9414959 | 11/1994 |

* cited by examiner

METHOD AND APPARATUS FOR BLEED-PRINTING AND METHOD AND APPARATUS FOR DECORATING A PAPER OBJECT

RELATED APPLICATIONS

This application is a Continuation of prior application Ser. No. 10/080,613, filed Feb. 22, 2002 now U.S. Pat. No. 6,989,912, which in turn is a continuation of application Ser. No. 09/481,579, filed on Jan. 12, 2000, now U.S. Pat. No. 6,549,298, which in turn is a divisional of application Ser. No. 09/004,533, filed Jan. 8, 1998, entitled METHOD AND APPARATUS FOR BLEED-PRINTING AND METHOD AND APPARATUS FOR DECORATING A PAPER OBJECT, which issued as U.S. Pat. No. 6,106,651 on Aug. 22, 2000, which in turn is a continuation of application Ser. No. 08/444,958, filed May 19, 1995, entitled METHOD FOR BLEED PRINTING, which issued as U.S. Pat. No. 5,730,826 on Mar. 24, 1998.

BACKGROUND OF THE INVENTION

1. Field of the Invention

The present invention relates to printing generally and bleed-printing on paper in particular. Bleed-printing is a method of printing on and processing a paper product so as to allow the printed matter to run off one or more edges of the printed piece after trimming. This results in the printed matter extending to the very edge of the resulting printed piece. More particularly, the present invention relates to bleed printing on social stationery. Within this application, the term “social stationery” is meant to refer to any kind of printed paper product used as part of a social event. Examples of social stationery include greeting cards, business cards, wedding invitations, napkins, place cards, etc. In another aspect, the present invention relates to decorating a napkin.

2. Discussion of the Related Art

Bleed-printing and methods for bleed-printing are known in the art.

Conventionally, in order to print a piece of social stationery so that the printed matter extends to the edge of the social stationery, the printed matter is first printed on a piece of raw paper stock. Thereafter, the edge of the paper stock is trimmed using, for example, a paper cutter or die-cutter, to cut an edge on the paper stock so that the printing extends to this edge. In other words, the raw social stationery is typically larger than the finished social stationery product will be. The printed matter is printed onto the paper stock so that it is larger than the finished size of the social stationery product. Thereafter, the raw paper stock is trimmed to its finished product size so that the printed matter extends to the trimmed edge. In practice, this method of bleed-printing typically is not used in point of sale type personalization equipment (such as greeting card printers found in many retail establishments) because of the added cost of automatic paper cutting machinery or the need to have a clerk available to trim the raw social stationery (such as a personalized greeting card) using a paper cutter after the customer has personalized the social stationery.

In the same manner if printing close to the edge of the piece of social stationery is desired, this process of printing and trimming may also be required because many printers do not have the capability of placing printed matter closer than a predetermined distance from the edge of the raw paper stock. If the desired space between the printed matter and the edge of the finished product is smaller than the predetermined distance, than trimming is still required.

It is currently not possible to use an ink jet type printer of the type found in personalization equipment in retail establishments to bleed-print social stationery such as greeting cards. This is because a small margin surrounding the printed material is required when using an ink jet printer to prevent ink from being unintentionally applied to the paper handling mechanism in the ink jet printer. If ink is applied to the paper handling mechanism, then subsequent items of social stationery that are processed by the printer may end up with ink unintentionally applied to the social stationery. In addition, overspray from ink may interfere with operation of the paper handling mechanism within the printer. Furthermore, if printing is done too close to the edge of the raw paper stock where paper handling by a typical ink jet printer is less precise, the printed material may become smudged or distorted. Finally, some ink jet printers require a predetermined space between the edge of the printed matter and the raw paper stock and are therefore unable to print close to or at the edge of the finished paper product.

Decorating social stationery such as napkins is typically done using a hot stamping process that can be relatively expensive for printing anything other than straight lines of type. In addition, hot stamping cannot print multiple colors and, for anything other than text, requires that a custom die be made up.

Use of an ink jet printer to directly print on the napkin is not feasible because the ink from the ink jet printer tends to bleed into the napkin, thus obscuring the printed matter, as well as causing the colors to possibly mix in unintended ways due to this bleeding. In addition, since napkins are typically multiple plys and very flexible, they are not easily fed through a paper handling mechanism of an ink jet printer.

Therefore, an object of the present invention is to provide a method and apparatus that allows for bleed-printing without requiring trimming of the paper after printing.

Another object of the present invention is to provide a bleed-printed paper product, particularly a piece of social stationery.

Another object of the present invention is to provide a method and apparatus that allows for decorating a piece of social stationery, such as a napkin.

Another object of the present invention is to provide a decorated napkin.

SUMMARY OF THE INVENTION

The present invention overcomes at least the noted disadvantages by providing a method of bleed-printing a paper product, such as a piece of social stationery, including the steps of attaching the paper product to be printed to a carrier using an adhesive. The paper product is either die-cut or precut to a size smaller than the carrier. If die-cut, the paper product is die-cut without cutting the carrier. The method also includes printing on the paper product so that the printed matter extends beyond at least one edge of a die-cut portion of the paper product, and removing the paper product from the carrier. The paper product may be attached to the carrier using an adhesive. The adhesive chosen is such that the paper product is substantially free of adhesive after it is removed from the carrier. A so-called “clean-release” technology is used so that the paper product has substantially no adhesive on it after it is removed from the carrier. The adhesive may be of a type that sticks substantially to the carrier only, or that is no longer tacky after the paper product is removed from the carrier.

In accordance with another aspect of the invention, a method of bleed-printing a paper product, such as a piece of social stationery includes the step of providing a paper product having perforations extending along at least one finished edge of the paper product to provide a margin, printing on the paper product so that the printed matter extends beyond the at least one finished edge of the paper product and into the margin, and removing the margin portion from the paper product along the perforation.

The method according to the present invention thus advantageously allows bleed-printing without requiring any trimming or cutting of the finished edge of the paper product.

The invention also includes a printed product, such as a piece of social stationary, including a carrier, a paper product attached to the carrier using an adhesive, the paper product being die-cut, and printed matter disposed on the paper product so that the printed matter extends beyond at least one edge of a die-cut portion of the paper product.

In accordance with another aspect, the invention also includes a printed product, such as a piece of social stationery, including a carrier, a paper product attached to the carrier using adhesive, the paper product being pre-cut to a size smaller than the carrier so that the carrier extends beyond at least one edge of the finished paper product, and printed matter disposed on the paper product so that the printed matter extends beyond at least one edge of the finished paper product.

The invention also includes a printed product, such as a piece of social stationery, including a paper product having a perforation extending along at least one finished edge of the paper product to define a margin, and printed matter disposed on the paper product so that the printed matter extends beyond the at least one finished edge of the paper product into the margin.

In accordance with another aspect of the invention, the method includes a method of decorating a napkin including the steps of printing printed material on a label comprising directory paper, and attaching the label to a napkin using a non-toxic adhesive.

The invention also includes a decorated napkin, including a paper napkin, a printed label comprising printed material on directory paper, and an adhesive attaching the printed label to the paper napkin.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, which are incorporated herein be reference and which like elements have been given like reference characters.

DETAILED DESCRIPTION

For purposes of illustration only, and not to limit generality, the present invention will now be explained with reference to a piece of social stationery, such as a piece of paper that is to be bleed-printed. However, one skilled in the art will appreciate that the present invention may be used to bleed-print any type of paper product.

Figure 1:
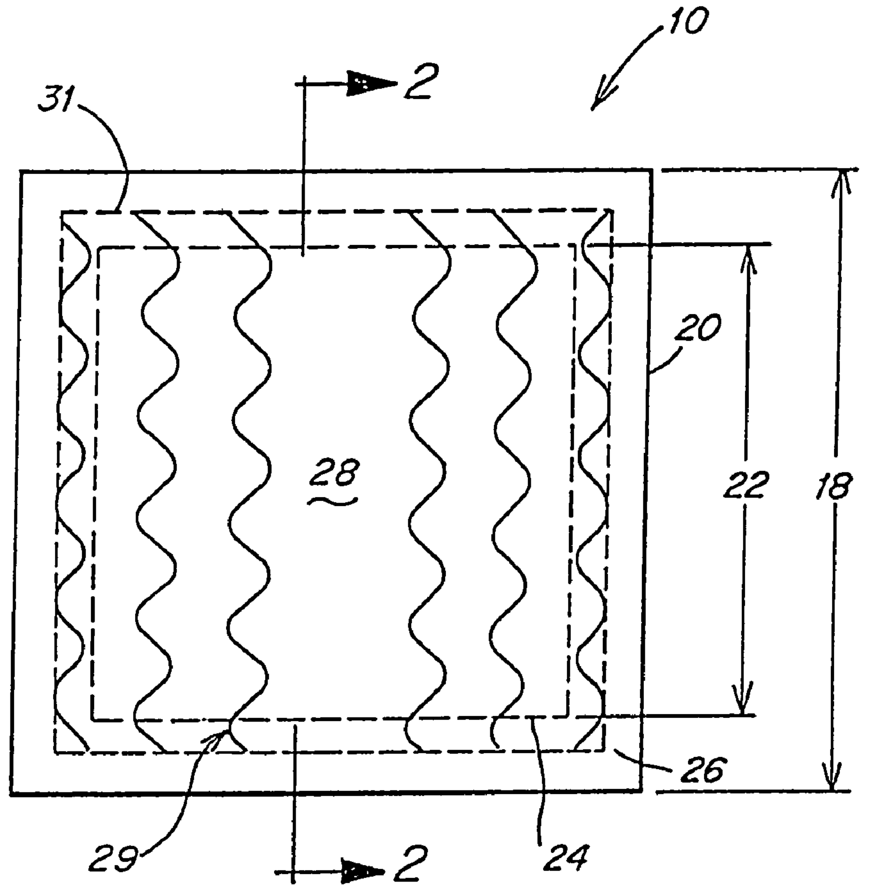
FIG. 1 is a plane view of a paper product laminate used to create social stationery in accordance with the present invention.
Figure 2:
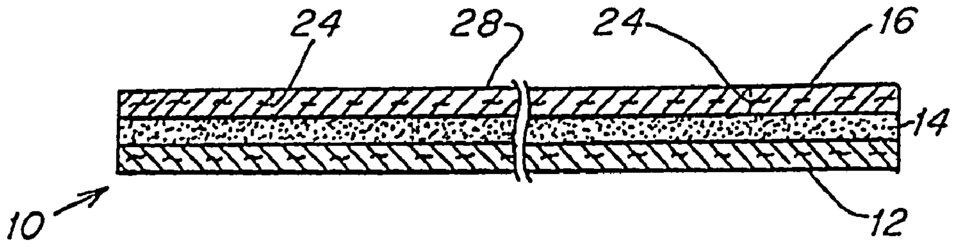
FIG. 2 is a cross sectional view of the paper product of FIG. 1 along lines 2-2.

Reference is now made to FIGS. 1 and 2 which illustrate a paper product laminate 10 that allows for bleed-printing. As shown in FIG. 2, the paper product laminate includes a carrier 12 which may be a sheet of paper. Alternatively, the carrier 12 may be a plastic sheet. The carrier 12 acts as a backing sheet for the paper product laminate.

Disposed on top of the carrier 12 is an adhesive 14. A sheet of paper 16 is placed on top of the carrier/adhesive combination. Alternatively, the adhesive 14 could be applied to sheet of paper 16 and then attached to carrier 12, or adhesive 14 could be applied to both carrier 12 and sheet of paper 16 which are then attached to each other.

The paper product laminate 10 is sized so that its overall size is larger that the finished sheet of paper. In FIG. 1, dimension 18 is the raw size of the paper product laminate along edge 20. Dimension 22 along dashed line 24 represents the size of the finished paper product. Area 26 between the raw edge 20 and the finished edge 24 is the margin.

One skilled in the art will appreciate that the square shape shown in FIG. 1 is exemplary. The margin, as well as the finished edge dimensions and the raw size dimension can be arbitrarily chosen depending upon the size and shape of the finished social stationery, the size and shape of the carrier, and so on.

To carry out the method of the present invention, the sheet of paper 16, the adhesive 4 and the carrier 12 are placed on top of each other to form the paper product laminate 10. Thereafter, the sheet of paper 16 is die-cut along dashed line 24. Dashed line 24 represents the size of the finished sheet of paper after printing. Only sheet 16 is die-cut, the carrier 12 is not cut. Thereafter, paper product laminate 10 is printed upon by a printer such as an ink jet printer. The printer is arranged so that the printed material 29 extends beyond dashed line 24 into margin 26, to, for example, dashed line 31, but not beyond the edge 20 of paper product laminate 10.

After printing has been completed, only the sheet of paper 16 occupying area 28 within dashed line 24 is removed from the paper product laminate. Since the printing has extended into the margin 26, the finished sheet of paper occupying area 28 is bleed-printed.

An important feature of the present invention is the adhesive 14 used to form the paper product laminate. Adhesive 14 is of a type that does not adhere to sheet 16 after it has been removed from the paper product laminate 10 within the die-cut area 28. Adhesive 14 may be of a type that sticks only to carrier 12. An example of this type of adhesive is found on Post-It Brand Notes manufactured by the 3M Company. Alternatively, adhesive 14 may be of the type used in so called “clean-release” technology. Within this disclosure, the term “clean-release” is meant to refer to adhesives that, when sheet 16 is separated from carrier 12, leave no tacky residue on either the carrier or the sheet of paper. A clean-release adhesive that may be used in the present invention is available from the Standard Register Company. This type of adhesive is advantageous because if sheet of paper 16 and carrier 14 become separated during the printing process within a printer, the parts will not stick to the printer mechanism and therefore are less likely to damage the printer. Since they are not tacky, sheet of paper 16 and carrier 12 may be easily removed from a printer if they do become separated.

The sheet of paper 16 used in paper product laminate 10, can be any paper-appropriate for the specific printing process. Examples include laser paper for laser printers, coated papers for ink jet type printers, or special papers used in die sublimation printing processes.

Figure 3:
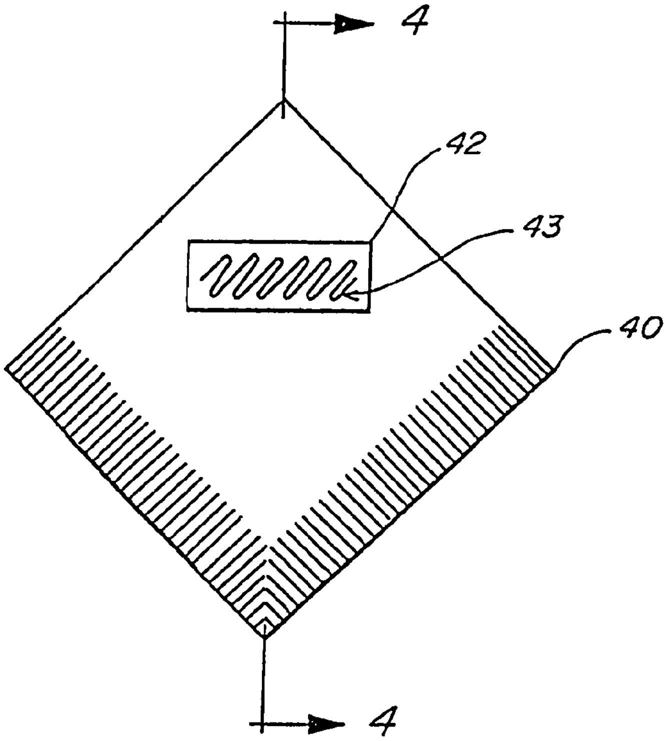
FIG. 3 is a plane view of a decorated napkin in accordance with the present invention.
Figure 4:
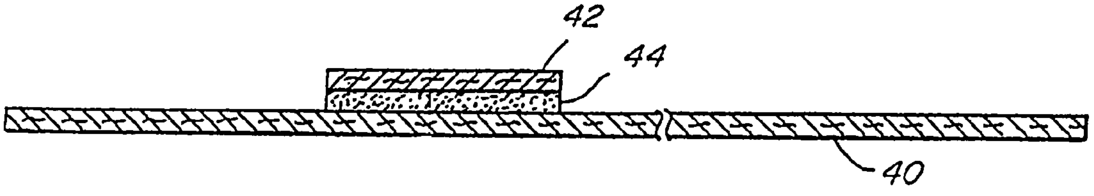
FIG. 4 is a cross sectional view along lines 4-4 of the napkin of FIG. 4.

Reference is now made to FIGS. 3 and 4, which figures illustrate a decorated napkin in accordance with the present invention.

FIG. 3 illustrates a napkin 40 having a preprinted label 42 attached thereto using a non-toxic adhesive. The napkin 40 may be any type of commonly available napkin, such as a cocktail, luncheon or dinner napkin.

As illustrated in FIG. 4, the label 42 having printed material 43 on it is attached to napkin 40 using a layer of non-toxic adhesive 44. Layer 44 is a permanent adhesive approved by the Food and Drug Administration for contact with food through a barrier.

The paper substrate of label 42 is what is commonly known as "directory paper". This paper typically has a thickness of 0.002 inches. When printed and then adhered to napkin 40, label 42 feels as though it is actually part of napkin 40, since the paper substrate of label 42 has the same feel and consistency as napkin 40. In a preferred embodiment, the paper substrate of label 42 is a 0.002 inch thick 28 pound high opaque English finish directory paper available from Champion Paper Company.

We have found that using the type of printed label on the napkin as illustrated in FIGS. 3 and 4 can provide a decorated napkin having any type of artwork or printed matter that can be printed by an ink jet printer. This is advantageous because the decorated napkin can be made to match any other artwork that may be part of a party theme or the napkin may be made to match other pieces of social stationery. We have also found that even when the napkin is folded or crumpled, label 42 remains attached to napkin 40 and the entire product still retains a napkin-like characteristic.

An important feature of the napkin illustrated in FIGS. 3 and 4 is the choice of the paper substrate for label 42. We have found that so called directory paper has the appropriate characteristics.

One skilled in the art will appreciate that label 42 can be manufactured using the method discussed in connection with FIGS. 1 and 2, 5 and 6, and 7.

Figure 5:
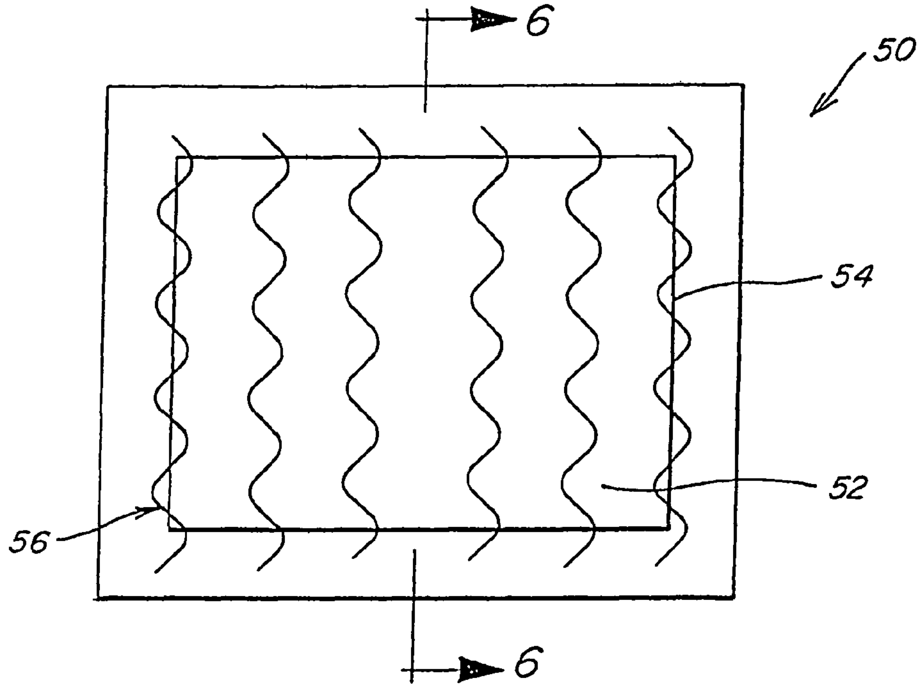
FIG. 5 is a plane view of an alternate embodiment of a paper product laminate used to create social stationery in accordance with the present invention.
Figure 6:
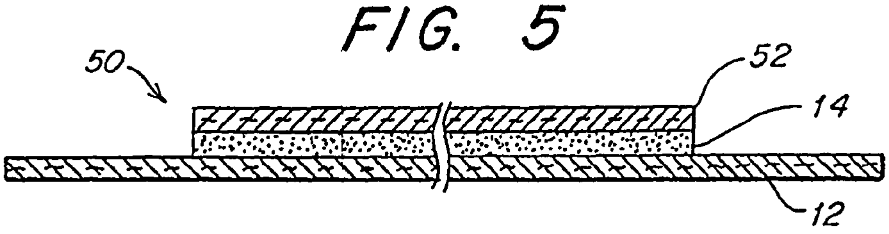
FIG. 6 is a cross sectional view of the paper product laminate of FIG. 5 along lines 6-6.

Reference is now made to FIGS. 5 and 6, which figures illustrate another embodiment of the present invention. As shown in FIGS. 5 and 6, a paper product laminate 50 includes a carrier 12, adhesive 14 and a sheet of paper 52 disposed on top of adhesive 14. In this second embodiment, all of the characteristics of carrier 12 and adhesive 14 are as described in accordance with FIGS. 1 and 2.

In this second embodiment, the sheet of paper 52 is precut so that it has smaller overall dimensions than carrier 12. Carrier 12 thus extends beyond at least one finished edge 54 of the sheet of paper 52. When sheet of paper 52 is printed upon, the printed matter 56 extends beyond the at least one finished edge 54 of the sheet of paper 52 onto carrier 12. Thereafter, the sheet of paper 52 is removed from carrier 12. Since the printed matter 56 has extended onto carrier 12, the finished sheet of paper 52 is bleed-printed. In the second embodiment, sheet of paper 52 is precut to the size of the finished paper product, rather than die cut, as illustrated in FIGS. 1 and 2.

Figure 7:
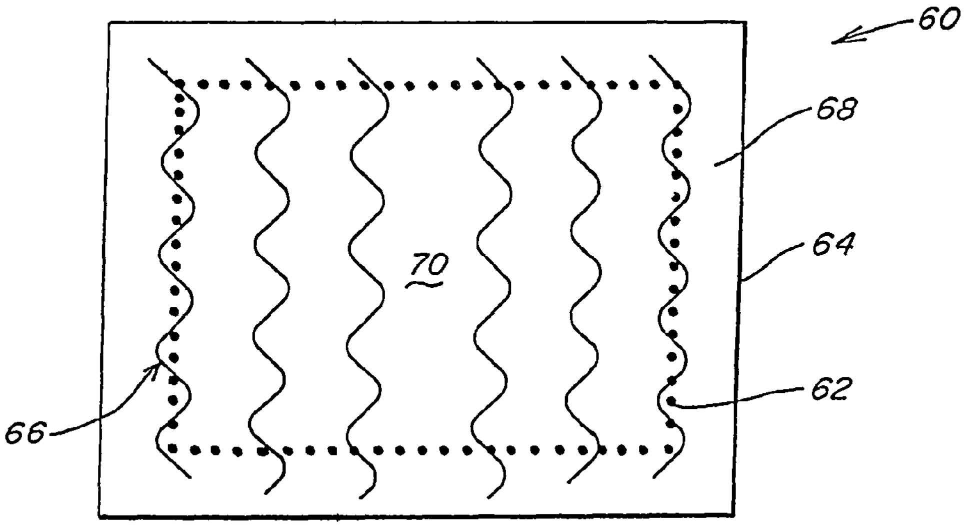
FIG. 7 is a plane view of a paper product that may be used to create social stationery in accordance with the present invention.

FIG. 7 illustrates a third embodiment of the invention. In FIG. 7, a single sheet of paper 60 having a perforated line 62 that extends along at least one edge 64 of sheet 60 is provided. Sheet 60 is then printed upon by a printer so that the printed matter 66 extends beyond the perforated line 62 into a margin 68 between the perforated line 62 and the edge 64 of sheet 60. Thereafter, when the perforations of line 62 are torn so that the margin 68 and the portion of sheet 60 occupying area 70 inside the perforated line 62 is separated, the finished sheet of paper 70 is bleed-printed.

As with the first embodiment, the second and third embodiments of the invention also advantageously allow for the finished paper product to be bleed-printed without requiring that the edges of the finished paper product be trimmed in order that the printed matter extend to the very edge of the finished paper product.

One skilled in the art will appreciate that the embodiments illustrated in FIG. 1, 2 or 5, 6 could be arranged into an array so that multiple paper product laminates using, for example, a common carrier sheet could be provided. This allows simultaneous printing of multiple paper products.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

The invention claimed is:

1. A product configured and arranged to be received by a printer and configured and arranged so that the printer can print printed matter on the product, the product comprising:

a surface of at least one sheet that receives the printed matter from the printer, the surface having a first area and a second area;

a physical boundary that is physically located between the first area and the second area, the physical boundary constructed and arranged to facilitate separation of the first area and the second area from each other along the physical boundary; and printed matter that is bleed-printed within the first area and onto the physical boundary, and extends continuously across the physical boundary into the second area.

2. The product of claim 1, wherein the physical boundary comprises at least one line of perforation, and the printed matter is printed onto the line of perforation.

3. The product of claim 1, wherein the physical boundary comprises at least one cut, and the printed matter is printed onto the at least one cut.

4. The product of claim 1, wherein the physical boundary comprises one or more straight lines.

5. The product of claim 4, wherein the first and second areas are respective parts of a sheet having a rectangular shape and the physical boundary is a single line parallel to one side of the sheet and extending from one edge to another edge, dividing the sheet into the first and second areas.

6. The product of claim 5, wherein the sheet has the surface, which is arranged for use in an inkjet printer.

7. The product of claim 6, wherein the second area into which bleed printing extends is large enough to allow holding of the sheet without touching the printed matter on the second area.

8. The product of claim 4, wherein the first and second areas are respective parts of a single sheet having a rectangular shape and the physical boundary includes two lines parallel to one side of the sheet and extending from one edge to another edge, dividing the sheet into three areas.

9. The product of claim 8, wherein the sheet has the surface, which is arranged for use in a transfer printer.

10. The product of claim 8, wherein the parallel boundary lines are formed perpendicular to a path that the sheet travels in the printer and the three areas of the paper are a first area forming a leading edge, a second area forming a main print area, and a third area forming a trailing edge, respectively, and the printed matter is bleed-printed continuously across the physical boundary into the first and third areas.

11. The product of claim 4, wherein the first and second areas are respective parts of a single sheet having a rectangular shape with four sides and the physical boundary includes at least four lines, each line being parallel to one of the sides of the sheet and extending from one side to an opposite side, dividing the sheet into an inner rectangular area surrounded by removable areas.

12. The product of claim 11, wherein the sheet has the surface, which is arranged for use in an inkjet printer.

13. The product of claim 1, wherein the product comprises one or more print media suitable for laser printing.

14. The product of claim 1, wherein the product comprises one or more print media suitable for ink jet printing.

15. The product of claim 1, wherein the product comprises one or more print media suitable for dye sublimation printing.

16. The product of claim 1, wherein the first area is a single continuous area and is the only area on the surface constructed and arranged to serve as a primary printing area for printed matter.

17. The product of claim 16, wherein the first area has a rectangular shape.

18. The product of claim 1, wherein the physical boundary is constructed and arranged such that the second area comprises at least two sub-areas that are not contiguous.

19. A method of printing graphical matter on a product comprising a surface of at least one sheet that receives the printed matter from a printer, the surface having a first area and a second area, and a physical boundary that is physically located between the first area and the second area, the method comprising:

bleed-printing the printed matter within the first area and extending continuously across the physical boundary into the second area, so that a finished product is produced by separating the first area and the second area from each other along the physical boundary.

20. The method of claim 19, wherein the act of printing comprises bleed-printing the printed matter on the surface so that the printed matter is formed continuously along the entire physical boundary dividing the first and second areas.

21. The method of claim 19, wherein the first and second areas are respective portions of a single sheet, and the physical boundary is formed by a perforation of the single sheet.

22. The method of claim 21, wherein the printed matter is printed onto the perforation.

23. The method of claim 22, wherein the perforation includes holes formed in the single sheet and the printed matter is printed into at least some of the holes of the perforation.

24. The method of claim 21, wherein the perforation includes a line of perforation that is parallel to one side of the single sheet and that separates the first area from the second area.

25. The method of claim 21, wherein the perforation includes a first line of perforation that is parallel to one side of the single sheet and that separates the first area from the second area, and the perforation includes a second line of perforation that is parallel to another side of the single sheet and separates the first area from a third area, and wherein the printed matter is printed onto and extends continuously across the second line of perforation into the third area.

26. The method of claim 19, wherein the second area is part of a carrier, and the first area is part of a sheet that is attached to the carrier by an adhesive.

27. A system for printing on a product comprising a surface of at least one sheet that receives printed matter from a printer, the surface having a first area, a second area, and a physical boundary that is physically located between the first area and the second area, the system comprising:

a product arranged to receive printed matter on a surface of the at least one sheet having a first area and a second area, the first area being separated by a physical boundary between the first and second areas; and a printer operative to print the printed matter on the surface of the product, to bleed print the printed matter within the first area, onto the physical boundary and extending continuously across the physical boundary into the second area of the product, and to output the product with the printed matter printed thereon, such that a finished product is produced by separating the first area and the second area from each other along the physical boundary.

28. The system of claim 27, wherein the second area is part of a carrier, and first area is part of a sheet that is attached to the carrier by an adhesive.

29. The system of claim 27, wherein the first and second areas are respective portions of a single sheet, and the physical boundary is formed by a perforation of the single sheet.

30. The system of claim 29, wherein the printed matter is printed onto the perforation.

31. The system of claim 30, wherein the perforation includes holes formed in the single sheet and the printed matter is printed into at least some of the holes of the perforation.

32. The system of claim 29, wherein the perforation includes a line of perforation that is parallel to one side of the single sheet and that separates the first area from the second area.

33. The system of claim 29, wherein the perforation includes a first line of perforation that is parallel to one side of the single sheet and that separates the first area from the second area, and the perforation includes a second line of perforation that is parallel to another side of the single sheet and separates the first area from a third area, and wherein the printed matter is printed onto and extends continuously across the second line of perforation into the third area.

* * * * *